US006423445B1

(12) United States Patent
Kato et al.

(10) Patent No.: US 6,423,445 B1
(45) Date of Patent: Jul. 23, 2002

(54) ALKALINE BATTERY SEPARATORS

(75) Inventors: Koichi Kato; Kazuya Sato; Masanao Tanaka, all of Ibaraki (JP)

(73) Assignee: Japan Vilene Company Ltd., Tokyo (JP)

( * ) Notice: Subject to any disclaimer, the term of this patent is extended or adjusted under 35 U.S.C. 154(b) by 0 days.

(21) Appl. No.: 09/401,143

(22) Filed: Sep. 22, 1999

(30) Foreign Application Priority Data

Sep. 22, 1998 (JP) ............................................ 10-267140

(51) Int. Cl.⁷ ................................................. H01M 2/16
(52) U.S. Cl. ........................ 429/142; 429/253; 429/254; 428/392; 428/515; 428/516
(58) Field of Search ................................ 429/142, 144, 429/249, 253, 254; 428/392, 515, 516

(56) References Cited

U.S. PATENT DOCUMENTS 3,660,150 A * 5/1972 Cooper
4,424,243 A * 1/1984 Nishimoto et al. ..... 428/516 X
4,917,734 A * 4/1990 Demay et al.
5,453,333 A * 9/1995 Takauchi et al. ........ 429/142 X
5,593,734 A * 1/1997 Guerdoux et al.

FOREIGN PATENT DOCUMENTS

| EP | 0 450 449 | | 10/1991 |
| JP | 55-036279 | * | 3/1980 |
| JP | 4-125122 | * | 4/1992 |

OTHER PUBLICATIONS

Patent Abstract of Japanese Patent 55–105962 Aug. 1980.
Patent Abstract of Japanese Patent 55–096554 Jul. 1980.
Patent Abstract of Japanese Patent 05–261851 Oct. 1993.
English Abstract ofJapanese unexamined patent Publication (Kokai) No. 7–192713 (Jul. 1995).

* cited by examiner

Primary Examiner—Stephen Kalafut
(74) Attorney, Agent, or Firm—Darby & Darby

(57) ABSTRACT

An alkaline battery separator comprising a gas-permeable sheet which contains a hydrophilic portion carrying a methacrylic/ethylene copolymer component having a crystallinity of 25% or more on at least a part of a surface of said hydrophilic portion.

14 Claims, No Drawings

ALKALINE BATTERY SEPARATORS

BACKGROUND OF THE INVENTION

1. Field of the Invention

The present invention relates to an alkaline battery separator, i.e., a separator for an alkaline battery.

2. Description of the Related Art

In an alkaline battery, a separator is installed between a positive electrode and a negative electrode to separate them from each other and prevent a short-circuit. The separator can hold an electrolyte to thereby smoothly carry out an electromotive reaction.

The separator is required to have an erosion resistance to an electrolyte, such as potassium hydroxide, and a separator containing polyolefin fibers having an excellent alkali resistance is preferably used. However, polyolefin fiber has a poor affinity for an electrolyte, and thus, a separator of the a polyolefin fibers has a disadvantage in its capacity for holding an electrolyte (i.e., the electrolyte-holding capacity).

A sulfonating treatment of the separator containing polyolefin fibers is known as a means of imparting an affinity for an electrolyte to such a separator. However, the sulfonating reaction of the separator containing polyolefin fibers cannot be efficiently carried out, and further, the reaction is carried out under dangerous condition wherein a fuming sulfuric acid is used. To efficiently carry out the sulfonating reaction under a moderate condition, methods for sulfonating a fiber sheet containing, as a polyolefin fiber, fibers carrying an acrylic acid/ethylene copolymer on a surface thereof are proposed in, for example, Japanese Unexamined Patent Publication (Kokai) No. 5-121062, Japanese Unexamined Patent Publication (Kokai) No. 5-121063, Japanese Unexamined Patent Publication (Kokai) No. 5-307947, Japanese Unexamined Patent Publication (Kokai) No. 6-111801, and Japanese Unexamined Patent Publication (Kokai) No. 6-207321.

It is true that the fiber sheet containing fibers that carry an acrylic acid/ethylene copolymer on a surface thereof can be efficiently sulfonated. However, if the fiber sheet is used as a separator in a nickel-hydrogen battery, self-discharge thereof is very difficult to inhibit, and thus the battery capacity is often considerably reduced.

SUMMARY OF THE INVENTION

The inventors of the present invention found that an excellent effect of inhibiting a self-discharge can be obtained if a separator sheet contains, on at least a part of a surface thereof, a methacrylic/ethylene copolymer having a crystallinity of 25% or more, and that a hydrophilicity can be easily imparted to or enhanced for the methacrylic/ethylene copolymer. The present invention is based upon these findings.

Accordingly, the object of the present invention is to remedy the shortcomings in the prior art, and to provide an alkaline battery separator exhibiting an excellent effect of inhibiting a self-discharge, and is capable of easily being treated to obtain a hydrophilicity during the manufacturing process thereof.

Other objects and advantages will be apparent from the following description.

In accordance with the present invention, there is provided an alkaline battery separator comprising a gas-permeable sheet which contains a hydrophilic portion carrying a methacrylic/ethylene copolymer component on at least a part of a surface of the hydrophilic portion (and at the same time a surface of the gas-permeable sheet), a crystallinity of the methacrylic/ethylene copolymer being 25% or more.

DESCRIPTION OF THE PREFERRED EMBODIMENTS

The gas-permeable sheet for the alkaline battery separator according to the present invention may be, for example, a fiber sheet, such as a nonwoven fabric, a woven fabric, a knitted fabric, a composite fabric thereof, or a microporous film. The fiber sheet may contain the hydrophilic portion in the form of hydrophilic fibers carrying the methacrylic/ethylene copolymer component on at least a part of a surface thereof. Further, the fiber sheet may contain the hydrophilic portion in the form of hydrophilic powder materials containing the methacrylic/ethylene copolymer component on at least a part of a surface of the powder material and at the same time, at least a part of a surface of the constituent fibers. The microporous film may contain the hydrophilic portion in the form of a surface layer on the film. When such a microporous film is used, the film may preferably include a fibrous sheet on at least one side.

The hydrophilic fiber or powder material used in the present invention is particularly a hydrophilicity-enhancing fiber a powder material prepared by enhancing a hydrophilic property of the fiber or powder material containing the methacrylic/ethylene copolymer component on at least a part of a surface thereof and having a poor hydrophilicity, or a hydrophilicity-imparting fiber or powder material prepared by imparting a hydrophilic property to the fiber or powder material containing the methacrylic/ethylene copolymer component on at least a part of a surface thereof and having little hydrophilicity.

The hydrophilic portion-containing microporous film used in the present invention is particularly a hydrophilicity-enhancing microporous film prepared by enhancing a hydrophilic property of the microporous film containing the methacrylic/ethylene copolymer component on at least a part of a surface thereof and having a poor hydrophilicity, or a hydrophilicity-imparting microporous film prepared by imparting a hydrophilic property to the microporous film containing the methacrylic/ethylene copolymer component on at least a part of a surface thereof and having little hydrophilicity.

In one embodiment of the present invention, the alkaline battery separator is, for example, a single layer composed of the fiber sheet containing hydrophilic fibers as above. In another embodiment, the alkaline battery separator is, for example, a laminated sheet composed of a microporous film and a fiber sheet, or a laminated sheet composed of the microporous film sandwiched between two fiber sheets. In the latter cases where the microporous film is contained, the hydrophilic portion may be contained in the microporous film and/or the fiber sheet.

The present invention will be explained hereinafter mainly about the embodiment wherein the gas-permeable sheet and the fiber sheet comprising hydrophilic fibers containing the methacrylic/ethylene copolymer component.

The fiber sheet for the alkaline battery separator according to the present invention contains hydrophilic fibers, and the hydrophilic fibers carry the methacrylic/ethylene copolymer component on at least a part of a surface thereof.

The methacrylic/ethylene copolymer contained in the hydrophilic fiber may be prepared from a methacrylic acid comonomer or a methacrylic derivative comonomer and an ethylene comonomer. The methacrylic derivative may be, for example, a methacrylic acid ester with an alcohol, preferably an aliphatic saturated alcohol, such as an aliphatic saturated alcohol having 1 to 8 carbon atoms, or a methacrylic acid salt. The methacrylic acid ester is, for example, methyl methacrylate, ethyl methacrylate, butyl methacrylate, or 2-ethylhexyl methacrylate, and the methacrylic acid salt is, for example, an alkali metal salt, such as a potassium, sodium, or lithium salt. A preferred comonomer is methacrylic acid or potassium methacrylate.

The ratio of the methacrylic acid comonomer or a methacrylic derivative comonomer (hereinafter referred to as a methacrylic comonomer) and the ethylene comonomer is not particularly limited, so long as the crystallinity of the methacrylic/ethylene copolymer is 25% or more. Further, one or more other comonomers copolymerizable with the methacrylic comonomer and the ethylene comonomer, i.e., the third copolymerizable comonomer other than the methacrylic comonomer or the ethylene comonomer, may be present in the methacrylic/ethylene copolymer, so long as the crystallinity of the methacrylic/ethylene copolymer is 25% or more.

The methacrylic/ethylene copolymer may be an alternating copolymer, a random copolymer, a block copolymer, or a mixture thereof.

The methacrylic/ethylene copolymer contained in the hydrophilic fiber has a crystallinity of 25% or more, preferably 26% or more, more preferably 27% or more, most preferably 28% or more. If the crystallinity is less than 25%, the treatment for imparting or enhancing hydrophilicity may still be easily carried out, but the inhibitory effect on self-discharge may be considerably lowered.

The term "crystallinity" as used herein means a percentage of a heat quantity (J/g) required to fuse the methacrylic/ethylene copolymer to 290.4 J/g, i.e., the heat quantity required to fuse a completely crystalline polyethylene. The heat quantity required to fuse the methacrylic/ethylene copolymer is measured by raising the temperature of the methacrylic/ethylene copolymer at a rate of 10° C./minute from room temperature to 200° C. under an atmosphere of nitrogen gas in a differential scanning calorimeter (DSC). When a treatment to impart or enhance hydrophilicity is to be carried out, the "crystallinity" is a value measured before the treatment.

The methacrylic/ethylene copolymer component may cover a part of a surface or a whole surface of the hydrophilic fiber. The covering of the methacrylic/ethylene copolymer component on the surface of the hydrophilic fiber brings about an alkali resistance, an oxidation resistance, and a fusibility thereof. When the methacrylic/ethylene copolymer component covers a broader area of the surface of the hydrophilic fiber, the advantageous effects as above can be easily obtained. Therefore, preferably the whole surface of the hydrophilic fiber is covered with the methacrylic/ethylene copolymer component.

The hydrophilic fiber may be composed of only the methacrylic/ethylene copolymer, or composed of the methacrylic/ethylene copolymer component and one or more other polymeric components, i.e., a composite fiber. As the other polymeric components in the composite fiber, it is preferable to use one or more resin components having a melting point higher than the melting point of the methacrylic/ethylene copolymer component. This is so that the fibrous structures of the hydrophilic fibers may be maintained by the other resin components, when the methacrylic/ethylene copolymer components are fused. A sectional structure of the composite fiber is not particularly limited, so long as the methacrylic/ethylene copolymer is located at least on a part of the surface. The sectional structure thereof is preferably of a sheath-core, eccentric, or sea-island-like type. The composite fiber may be dividable by a physical action (a fluid jet, such as a water jet, or calendering) and/or a chemical action (a removal or swelling of one or more of the resin components).

The other polymeric material in the composite fiber is preferably a polyolefin resin, because the polyolefin resin has an excellent resistance to alkali and oxidation. Examples of a polyolefin are polyethylene, such as a low-density polyethylene, a straight-chain low-density polyethylene, a high-density polyethylene, or a ultra-high-molecular-weight polyethylene, polypropylene, polymethylpentene, ethylene-propylene copolymer, or an ethylene-butene-propylene copolymer.

The composite fiber having the methacrylic/ethylene copolymer component as a fusible component contains a component of a polymeric resin having a melting point higher than the melting point of the methacrylic/ethylene copolymer by preferably 10° C. or more, more preferably 20° C. or more. Specifically, such a polymeric resin may be, for example, polypropylene, a high-density polyethylene, polymethylpentene, or an ethylene-propylene copolymer. The term "melting point" as used herein means a temperature providing a turning value in a fusion-absorption curve obtained by raising the temperature of a material at a rate of 10° C./minute from room temperature in a differential scanning calorimeter (DSC).

A treatment used for imparting or enhancing a hydrophilic property may be, for example, a sulfonating treatment, a treatment with fluorine gas, a graft polymerization treatment, a discharging treatment, or the like. One or more treatments as above may be used to impart the hydrophilic property to the fibers having little or no hydrophilicity.

The sulfonating treatment includes, for example, but is not limited to, a treatment of dipping the fibers in a solution of fuming sulfuric acid, sulfuric acid, chlorosulfuric acid, sulfuryl chloride, or the like, a treatment placing them in contact with $SO_3$ gas, or a treatment of discharging them in the presence of SO and/or $SO_2$ gas. Of these treatments, the sulfonating treatment with fuming sulfuric acid is preferable, because of the high reactivity and an easier sulfonation obtained. In this case, sulfonic acid groups are introduced.

The experiments conducted by the inventors of the present invention revealed that, when a molar ratio (S/C) of sulfur atoms (S) contained in the sulfonic acid groups introduced into the fiber sheet of the alkaline battery separator by the sulfonating treatment to carbon atoms (C) contained in the polyolefin material which it is assumed will constitute the fiber sheet of the alkaline battery separator is $1 \times 10^{-3}$ or more (preferably $2 \times 10^{-3}$ or more), an excellent inhibitory effect on any self-discharge can be obtained. Hereinafter, the molar ratio (S/C) will be sometimes referred to as "a degree of sulfonation" or "a sulfonation degree". Because of an excellent inhibitory effect on a self-discharge, and less reduction of the strength, the sulfonation degree is preferably $1 \times 10^{-3}$ to $10 \times 10^{-3}$, more preferably $1 \times 10^{-3}$ to $5 \times 10^{-3}$, most preferably $1.5 \times 10^{-3}$ to $4 \times 10^{-3}$.

The "sulfonation degree" can be obtained as follows: A specimen (diameter=44 mm) is cut from a fiber sheet (area density="A" $g/m^2$) of an alkaline battery separator, and an X-ray intensity is measured by a fluorescent X-ray method to determine an amount of sulfur atoms per unit area ("Ms" $g/m^2$). Then, the amount of "Ms" is divided by 32, the atomic weight of a sulfur atom, to give an "S" mole of the sulfur atoms contained in the sulfonic acid groups introduced into the fiber sheet. Further, a "C" mole of the carbon atoms contained in the polymeric material constituting the fiber sheet is calculated by dividing the area density "A" g/m$^2$ by 14, the molecular weight of $CH_2$. The calculation is based on the assumption that the specimen of the fiber sheet is composed of only polyolefins. The "sulfonation degree" (S/C) can be calculated by dividing the "S" mole of the sulfur atoms by the "C" mole of the carbon atoms.

The treatment with fluorine gas includes, for example, but is not limited to, a treatment with a gas mixture of fluorine gas diluted with an inactive gas (such as nitrogen or argon gas) and at least one gas selected from the group consisting of oxygen, carbon dioxide and sulfur dioxide gases. The hydrophilic property can be effectively and permanently imparted by absorbing sulfur dioxide gas on to the fiber sheet, and then bringing the fiber sheet into contact with fluorine gas. The treatment with fluorine gas can introduce groups containing one or more fluorine atoms.

The graft polymerization treatment can be conducted by polymerizing graft-polymerizable monomers, such as vinyl monomers, to the fiber sheet. Examples of vinyl monomers which may be used in the graft polymerization treatment are acrylic acid, methacrylic acid, an acrylic acid ester, a methacrylic acid ester, vinyl pyridine, vinyl pyrrolidone, styrene, or the like. When styrene is grafted, it is preferable to further carry out the sulfonation treatment, to thereby impart an affinity with the electrolyte. Acrylic acid has a good affinity with an electrolyte and may be preferably used.

The graft-polymerizable monomers can be polymerized, for example, by dipping the fiber sheet in a solution containing the graft-polymerizable monomers and an initiator, and then heating; by coating the fiber sheet with the graft-polymerizable monomers and then applying radiation; by applying radiation to the fiber sheet and then bringing the fiber sheet into contact with the graft-polymerizable monomers; by impregnating the fiber sheet with a solution containing the graft-polymerizable monomers and a sensitizing agent, and then applying ultraviolet radiation. It is preferable to modify the surface of the fiber sheet with ultraviolet radiation, a corona discharge or a plasma discharge before bringing the fiber sheet into contact with the solution containing the graft-polymerizable monomers, because the affinity of the surface with the solution is thus enhanced and the graft polymerization can be effectively carried out.

As for the discharging treatment, there may be mentioned, for example, treatments with a corona discharge, plasma, glow discharge, surface discharge, or electron rays. A preferable form of plasma treatment comprises the steps of placing the fiber sheet between a pair of electrodes carrying a dielectric layer on a surface facing the other electrode under an atmospheric condition or more, i.e., in air under an atmospheric pressure or more, so that the outer surfaces of the fiber sheet are brought into contact with both dielectric layers without coming into contact with the electrodes, and then applying an alternating current voltage between the electrodes to thereby induce an electric discharge in the internal voids contained in the fiber sheet sandwiched between the electrodes. In this treatment, the fiber sheet can be effectively treated not only on the outer surfaces, but also the inside, whereby an electrolyte-holding capacity of the inside of the fiber sheet, i.e., the inside of the alkaline battery separator, becomes excellent. Therefore, an alkaline battery separator having an excellent oxygen adsorbability when overcharged, and excellent properties for an internal pressure can be prepared.

The fiber sheet for the alkaline battery separator according to the present invention may be, for example, a nonwoven fabric, a woven fabric, or a knitted fabric, or a composite fabric thereof. The fiber sheet preferably contains the nonwoven fabric, because the nonwoven fabric has a three-dimensional network of the fibers, and thus an excellent electrolyte-holding capacity. The ratio of a total surface area of the methacrylic/ethylene copolymer components on the hydrophilic fibers in the fiber sheet to a total surface area of all the constituent fibers contained in the fiber sheet is not particularly limited, as long as the alkaline battery separator exhibits excellent properties of an inhibitory effect on self-discharge, a hydrophilicity, an affinity for an electrolyte, an alkali resistance, an oxidation resistance, and a fusibility. However, the ratio is preferably 10% or more, more preferably 20% or more.

In one preferable embodiment of the present invention, the alkaline battery separator comprises the fiber sheet (preferably a nonwoven fabric) consisting essentially of the hydrophilic fibers carrying the methacrylic/ethylene copolymer component having a crystallinity of 25% or more on at least a part of a surface thereof.

The fiber sheet for the alkaline battery separator of the present invention may contain, in addition to the hydrophilic fibers, one or more other fibers, such as fine fibers, high-strength fibers, and/or fusible fibers.

The fine fiber may be, for example, a fine fiber having a fineness of 0.5 denier or less, preferably, $7 \times 10^{-7}$ denier to 0.3 denier. When contained, the fine fibers can enhance an electrolyte-holding capacity of the alkaline battery separator, and provide an excellent effect of inhibiting the production of dendrites.

When the fiber sheet contains the hydrophilic fibers containing the methacrylic/ethylene copolymer component as a fusible component, preferably the fine fibers having a melting point higher than a melting point of the methacrylic/ethylene copolymer by 10° C. or more, more preferably 20° C. or more, most preferably 30° C. or more, to thus maintain the fibrous structure of the fine fibers. The fine fiber in the fiber sheet is preferably a polyolefin resin, because the polyolefin resin has an excellent resistance to alkali. Examples of the polyolefin resin for the fine fibers are polyethylenes, such as, low-density polyethylene, straight-chain low-density polyethylene, high-density polyethylene, or ultra-high-molecular-weight polyethylene, polypropylene, polymethylpentene, ethylene-propylene copolymer, or ethylene-butene-propylene copolymer, but polyethylene, such as low-density polyethylene, straight-chain low-density polyethylene, or high-density polyethylene, polypropylene, or polymethylpentene are preferable.

The fine fibers may be formed by dividing dividable or splittable fibers by a physical action (a fluid jet, such as a water jet, or calendering) and/or a chemical action (a removal or swelling of one or more resin components), or by a melt-blown method. It is preferable to use dividable fibers having an excellent fiber-strength. Preferable dividable fibers may be, for example, a sea-islands type or an orange-like cross-sectional type composite fiber. Such composite fibers may be prepared by a conventional composite-spinning method.

The fiber sheet for the alkaline battery separator of the present invention may contain high-strength fibers having a tensile strength of 5 g/denier or more. The tensile strength of the high-strength fiber is preferably 7 g/denier or more, more preferably 9 g/denier or more, most preferably 12 g/denier or more. The term "tensile strength" as used herein means a value measured in accordance with JIS (Japanese Industrial Standard) L1015, a testing method for chemical staple fibers. It is preferable to use a fiber sheet containing such high-strength fibers, because a short circuit between electrodes via an electrode flash which penetrates, during the assembly of the alkaline battery, through the separator from one electrode to another electrode, or tearing by an electrode edge during the assembly of the battery, are avoided.

The high-strength fiber in the fiber sheet also is preferably a polyolefin resin, because a polyolefin resin has an excellent resistance to alkali. As examples of the polyolefin for the high-strength fibers, there may be mentioned polyethylenes, such as, a low-density polyethylene, a straight-chain low-density polyethylene, a high-density polyethylene, or an ultra-high-molecular-weight polyethylene, polypropylene, polymethylpentene, an ethylene-propylene copolymer, or ethylene-butene-propylene copolymer, but a polyethylene or an ultra-high-molecular-weight polyethylene having an average molecular weight of about 1,000,000 to 5,000,000 are preferable.

The fiber sheet for the alkaline battery separator of the present invention may contain fusible fibers, in addition to the hydrophilic fibers. The fusible fibers used in a conventional nonwoven fabric may be contained in the fiber sheet for the alkaline battery separator of the present invention. When the fiber sheet contains the fusible fibers, a tensile strength and bending resistance thereof can be enhanced, and thus the alkaline battery can be assembled in a higher yield.

The fusible fiber used preferably contains at least on a surface thereof a resin component having a melting point lower than the melting points of all of the constitutional fibers other than the fusible fibers in the fiber sheet, to avoid any reduction of the strength of all of the constitutional fibers other than the fusible fibers. The component, which is sometimes referred to hereinafter as a low-melting-point component, has a melting point lower than the melting points of all of the constitutional fibers other than the fusible fibers in the fiber sheet, by preferably 10° C. or more, more preferably 15° C. or more. If the methacrylic/ethylene copolymer constituting the hydrophilic fiber or the hydrophilic composite fiber is fused, the melting point of the low-melting-point component may not be lower than the melting point of the methacrylic/ethylene copolymer.

The fusible fiber in the fiber sheet may be composed of one or more polyolefin resins. As examples of the polyolefin for the fusible fibers, there may be mentioned polyethylene or an a, low-density polyethylene, a straight-chain low-density polyethylene, a high-density polyethylene, or an ultra-high-molecular-weight polyethylene, polypropylene, polymethylpentene, an ethylene-propylene copolymer, or an ethylene-butene-propylene copolymer. When the fiber sheet contains the ultra-high-molecular-weight polyethylene fibers as the high-strength fiber, the fusible fibers are preferably fused at a temperature lower than a softening point of the ultra-high-molecular-weight polyethylene fiber (for example, 125° C.), to avoid a reduction of the strength of the ultra-high-molecular-weight polyethylene fibers. Therefore, the fusible fiber used in this case preferably contains the low-density polyethylene as the low-melting-point component.

The fusible fiber may be composed of one or more resin components. The fusible composite fiber is preferable, because it can enhance the tensile strength of the alkaline battery separator. If the fusible fiber is a composite fiber containing two or more resin components, the sectional structure thereof may be, for example, of a sheath-core, side-by-side, eccentric, sea-islands-like, or orange type.

The ratio of the hydrophilic fibers and fine fibers, high-strength fibers and fusible fibers contained in the fiber sheet for the alkaline battery separator of the present invention is not particularly limited. Typically, the fiber sheet may contain 5 to 100 mass % of the hydrophilic fibers, 0 to 70 mass % of the fine fibers, 0 to 70 mass % of the high-strength fibers, and 0 to 95 mass % of the fusible fibers.

The fiber sheet for the alkaline battery separator of the present invention may be prepared by a conventional method. An example of the methods for preparing a nonwoven fabric, which is preferable as the fiber sheet for the alkaline battery separator of the present invention, will be mentioned hereinafter.

A fiber web is prepared by a dry-laid method (for example, a carding or air-laid method) or a wet-laid method from fibers containing the methacrylic/ethylene copolymer component having a crystallinity of 25% or more, and optionally dividable fibers, high-strength fibers and/or fusible fibers. A fiber web may be prepared by a spun-bonding or melt-blown method. A laminate of the above fiber webs may be used. For example, a laminated fiber web may be prepared from fiber webs prepared by the dry-laid method, the wet-laid method, and so on. When a laminated fiber web composed of one or more fiber webs prepared by the dry-laid method and one or more fiber webs prepared by the wet-laid method is used, a nonwoven fabric derived therefrom has a tensile strength stemming from the fiber webs prepared by the dry-laid method and a uniformity stemming from the fiber webs prepared by the wet-laid method.

The fibers containing the methacrylic/ethylene copolymer component may be used to form the fiber web before or after imparting or enhancing a hydrophilicity by the above methods. In preparing the fiber web, it is possible to use the fibers carrying the methacrylic/ethylene copolymer component on at least a part of the surface thereof, or dividable fibers to form the fibers carrying the methacrylic/ethylene copolymer component on at least a part of the surface thereof after being divided.

An average fiber length of the constitutional fibers of the fiber sheet varies with the method used to prepare the fiber web. For example, fibers having an average fiber length of about 25 to 160 mm are suitable for the dry-laid method, or fibers having an average fiber length of about 1 to 25 mm are suitable for the wet-laid method. An average fineness of the constitutional fibers (or the dividable fibers, if applicable) of the fiber sheet is about 0.5 to 6 denier, because of an excellent electrolyte-holding capacity and ease in preparing the nonwoven fabric obtained thereby.

Thereafter, the nonwoven fabric is formed by bonding the fiber web. A method of bonding the fiber web may comprise, for example, entangling the fiber web by needle punching, or with a fluid jet, such as a water jet; partially or wholly fusing the fibers carrying the methacrylic/ethylene copolymer component on at least a part of the surface thereof; or partially or wholly fusing the fusible fibers if contained in the fiber web. The above method can be carried out alone or in combination. When the dividable fibers are contained in the fiber web, the entangling treatment can also bring about the division of the dividable fibers.

The fluid-entangling (optionally dividing) conditions are not particularly limited, but may be carried out under conventional conditions. For example, a nozzle plate containing one or more lines of nozzles having a diameter of 0.05 to 0.3 mm and a pitch of 0.2 to 3 mm may be used with a fluid jet (particularly water jet) under a pressure of 1 to 30 MPa. The fluid-entangling (particularly hydro-entangling) treatment may be carried out one or more times, if necessary, to one side or to both sides of the fiber web. If the fiber web is fluid-entangled (particularly hydro-entangled) on a support, such as a net or a perforated panel containing large pores, the resulting entangled nonwoven fabric also has large pores. The alkaline battery containing such an entangled nonwoven fabric is liable to caused a short circuit. Therefore, it is preferable to use a support having a pore-to-pore distance of 0.25 mm or less if the support has pores.

The treatment for fusing the methacrylic/ethylene copolymer component having a crystallinity of 25% or more in the hydrophilic fibers (or fibers before imparting or enhancing hydrophilicity) and/or the fusible fibers is carried out preferably under the condition that only the methacrylic/ethylene copolymer component and/or the low-melting-point component in the fusible fibers is fused. Specifically, the fiber web or the entangled nonwoven fabric is heated under a pressure, preferably at a temperature ranging from a softening point to a melting point of the methacrylic/ethylene copolymer component or the low-melting-point component. Alternatively, the fiber web or the entangled nonwoven fabric is heated without a pressure, preferably at a temperature ranging from the softening point to a temperature higher than a melting point by 20° C. of the methacrylic/ethylene copolymer component or the low-melting-point component, and thereafter pressed. When both of the methacrylic/ethylene copolymer component and the low-melting-point component are fused, the term "softening point" as above means a lower one of their softening points, whereas the term "melting point" means a higher one of their melting points. In each case, the pressure applied is preferably a linear pressure of about 5 to 30 N/cm. When the fiber web contains the ultra-high-molecular-weight polyethylene fibers as the high-strength fiber, it is preferable to carry out the fusing treatment at a temperature lower than a softening point of the ultra-high-molecular-weight polyethylene, for example, at 125° C.

The sequence of the entangling treatment and the fusing treatment is not specified. That is, the entangling treatment can be carried out first and then the fusing treatment, or alternatively, the fusing treatment first and then the entangling treatment.

When the fiber web contains dividable fibers having a high degree of freedom, particularly, dividable fibers consisting of polyolefins having an average fiber length of about 1 to 20 mm, division of the fibers becomes difficult. Therefore, the fusing treatment is preferably carried out first, to fuse at least one of the polymer components constituting the dividable fibers, the methacrylic/ethylene copolymer component in the hydrophilic fibers (or fibers before imparting or enhancing hydrophilicity), and the low-melting-point component in the fusible fibers, and thereby lower the degree of freedom of the fibers. Thereafter, the treatment with a fluid jet is carried out. However, the treatment with a fluid jet has a tendency to break the fused parts which have been formed before the dividing treatment. Therefore, it is preferable to carry out the fusing treatment again after the dividing treatment by fusing at least one of the polymer components constituting the dividable fibers, the methacrylic/ethylene copolymer component in the hydrophilic fibers (or fibers before imparting or enhancing hydrophilicity), and the low-melting-point component in the fusible fibers, and thereby enhance the tensile strength and rigidity thereof.

The hydrophilic fibers contained in the fiber sheet for the alkaline battery separator of the present invention carries the methacrylic/ethylene copolymer component having a crystallinity of 25% or more on at least a part of a surface thereof, and has a hydrophilicity imparted, for example, by one of the above methods. The fiber carrying the methacrylic/ethylene copolymer component on the surface can be easily treated to impart a hydrophilicity, particularly it is easily sulfonated. It is preferable to impart a hydrophilicity to all of the constitutional fibers of the fiber sheet, i.e., not only the fibers carrying the methacrylic/ethylene copolymer component thereon, but also the fine fibers, high-strength fibers, and/or fusible fibers, to thereby enhance the electrolyte-holding capacity thereof.

The treatment used to impart a hydrophilicity can be carried out before or after forming the fiber web, but preferably is carried out after forming the fiber web because of the ease of the production or enhanced electrolyte-holding capacity thus obtained.

The density per unit area of the resulting alkaline battery separator of the present invention is preferably 30 to 100 $g/m^2$, more preferably 40 to 80 $g/m^2$. If the density per unit area is less than 30 $g/m^2$, a sufficient tensile strength may not be obtained. If the density per unit area is more than 100 $g/m^2$, the separator becomes too thick and thus the ratio of the separator accounted for in a battery becomes too high to obtain a battery with a high capacity.

The alkaline battery separator of the present invention can be used in an alkaline primary battery, such as an alkaline-manganese battery, a mercury battery, a silver oxide battery, an air battery, or the like, or an alkaline secondary battery, such as a nickel-cadmium battery, silver-zinc battery, a silver-cadmium battery, a nickel-zinc battery, nickel-hydrogen battery or the like. When the alkaline battery separator of the present invention is used in a nickel-hydrogen or nickel-cadmium battery, a particularly excellent self-discharge inhibitory effect is exhibited.

EXAMPLES

The present invention now will be further illustrated by, but is by no means limited to, the following Examples.

Example 1

Sheath-core type ethylene fibers (fineness=2 denier; fiber length=10 mm; core-sheath ratio=1:1) were prepared by an spinning ethylene-methacrylic acid copolymer (melting point=105° C.; crystallinity=28%) as a sheath component and polypropylene (melting point=160° C.) as a core component at 260° C. from a conventional composite spinning apparatus, and drawing the spun fibers to a draw ratio of 3.

After forming a slurry containing only the resulting sheath-core type ethylene fibers as a fiber component, a fiber web was produced from the slurry by a conventional wet-laid method. The fiber web was heated without a pressure in a drier at 115° C., and then calendered under a linear pressure of 9.8 N/cm to fuse the sheath components and thereby form a nonwoven fabric.

The resulting nonwoven fabric was sulfonated by dipping it in a solution of fuming sulfuric acid (15% $SO_3$ solution) at 39° C. for 10 minutes. The sulfonated nonwoven fabric was thoroughly washed with water, dried, and calendered to obtain a fiber sheet for the alkaline battery separator of the present invention (area density=60 $g/m^2$; thickness=0.15 mm; sulfonated degree=$4.2 \times 10^{-3}$).

Example 2

A nonwoven fabric was prepared as in Example 1, and then sulfonated by dipping it in a solution of fuming sulfuric acid (15% $SO_3$ solution) at 50° C. for 10 minutes. The sulfonated nonwoven fabric was thoroughly washed with water, dried, and calendered to obtain a fiber sheet for the alkaline battery separator of the present invention (area density=60 g/m², thickness=0.15 mm; sulfonated degree= $11.0 \times 10^{-3}$).

Example 3

A nonwoven fabric was prepared as in Example 1, and then sulfonated by dipping it in a solution of fuming sulfuric acid (15% $SO_3$ solution) at 33° C. for 10 minutes. The sulfonated nonwoven fabric was thoroughly washed with water, dried, and calendered to obtain a fiber sheet for the alkaline battery separator of the present invention (area density=60 g/m²; thickness=0.15 mm; sulfonated degree= $2.8 \times 10^{-3}$).

Example 4

A nonwoven fabric was prepared as in Example 1, and then sulfonated by dipping it in a solution of fuming sulfuric acid (15% $SO_3$ solution) at 30° C. for 10 minutes. The sulfonated nonwoven fabric was thoroughly washed with water, dried, and calendered to obtain a fiber sheet for the alkaline battery separator of the present invention (area density=60 g/m²; thickness=0.15 mm; sulfonated degree= $2.1 \times 10^{-3}$).

Example 5

Two kinds of sheath-core type ethylene fibers were prepared; the first sheath-core type ethylene fibers were prepared as in Example 1, and the second sheath-core type ethylene fibers (fineness=2 denier; fiber length=10 mm; core-sheath ratio=1:1) were prepared by spinning high-density polyethylene (melting point=130° C.; crystallinity= 58%) as a sheath component and polypropylene (melting point=160° C.) as a core component.

After forming a slurry containing 30 mass % of the first sheath-core type ethylene fibers and 70 mass % of the second sheath-core type ethylene fibers, a fiber web was produced from the slurry by a conventional wet-laid method. The fiber web was heated without a pressure in a drier at 115° C., and then calendered under a linear pressure of 9.8 N/cm to fuse only the sheath components of the first sheath-core type ethylene fibers and thereby form a nonwoven fabric.

Thereafter, the resulting nonwoven fabric was sulfonated as in Example 2. The sulfonated nonwoven fabric was thoroughly washed with water, dried, and calendered to obtain a fiber sheet for the alkaline battery separator of the present invention (area density=60 g/m²; thickness=0.15 mm; sulfonated degree=$4.4 \times 10^{-3}$).

Example 6

A nonwoven fabric was prepared as in Example 1, and then sulfonated by dipping it in a solution of fuming sulfuric acid (15% $SO_3$ solution) at 25° C. for 10 minutes. The sulfonated nonwoven fabric was thoroughly washed with water, dried, and calendered to obtain a fiber sheet for the alkaline battery separator of the present invention (area density=60 g/m²; thickness=0.15 mm; sulfonated degree= $1 \times 10^{-3}$).

Example 7

A nonwoven fabric was prepared as in Example 1, and then sulfonated by dipping it in a solution of fuming sulfuric acid (15% $SO_3$ solution) at 43° C. for 10 minutes. The sulfonated nonwoven fabric was thoroughly washed with water, dried, and calendered to obtain a fiber sheet for the alkaline battery separator of the present invention (area density=60 g/m²; thickness=0.15 mm; sulfonated degree= $8.1 \times 10^{-3}$).

Comparative Example 1

Sheath-core type ethylene fibers (fineness=2 denier; fiber length=10 mm; core-sheath ratio=1:1) were prepared by spinning ethylene-methacrylic acid copolymer (melting point=104° C.; crystallinity=24%) as a sheath component and polypropylene (melting point=160° C.) as a core component at 260° C. from a conventional composite spinning apparatus, and drawing the spun fibers to a draw ratio of 3. A nonwoven fabric was prepared from the resulting sheath-core type ethylene fibers, as in Example 1.

The resulting nonwoven fabric was sulfonated by dipping it in a solution of fuming sulfuric acid (15% $SO_3$ solution) at 30° C. for 5 minutes. The sulfonated nonwoven fabric was thoroughly washed with water, dried, and calendered to obtain a fiber sheet for the comparative alkaline battery separator (area density=60 g/m²; thickness=0.15 mm; sulfonated degree=$5.1 \times 10^{-3}$).

Comparative Example 2

Sheath-core type ethylene fibers (fineness=2 denier; fiber length=10 mm; core-sheath ratio=1:1) were prepared by spinning ethylene-acrylic acid copolymer (melting point= 105° C.; crystallinity=28%) as a sheath component and polypropylene (melting point=160° C.) as a core component at 260° C. from a conventional composite spinning apparatus, and drawing the spun fibers to a draw ratio of 3.

The procedure as in Example 1 was repeated, except that the resulting sheath-core type ethylene fibers was used, to obtain a fiber sheet for the comparative alkaline battery separator (area density=60 g/m²; thickness=0.15 mm; sulfonated degree=$4.0 \times 10^{-3}$).

Evaluation (1) Test for Battery Capacity

As a current collector of electrodes, a paste nickel positive electrode (width=33 mm; length=182 mm) prepared from a foamed nickel base, and a paste hydrogen-occluded alloy negative electrode (mesh metal alloy; width=33 mm; length=247 mm) were formed. Each of the alkaline battery separators prepared in Examples 1 to 7 and Comparative Examples 1 and 2 was cut into a separator sample (width=33 mm; length=410 mm). The separator sample was sandwiched between the positive and negative electrodes and rolled into a voluted form to obtain SC type electrodes. The electrodes were put into an outer container, 5N potassium hydroxide and 1N lithium hydroxide were poured in as electrolytes, and the container was sealed to obtain a cylindrical nickel-hydrogen battery.

Each of the cylindrical nickel-hydrogen batteries was discharged at 0.1 C, and an initial capacity "A" at a final voltage of 1.0 V was measured. Then, each battery was charged at 0.1 C to 150% with respect to the capacity, and allowed to stand in a temperature controlled room at 65° C. for 5 days. Thereafter, each battery was discharged at 0.1 C, and a capacity "B" at a final voltage of 1.0 V was measured. Percentages of capacity maintained "C" was calculated by the following equation:

$$C(\%) = (B/A) \times 100.$$

The results are shown in Table 1.

(2) Lengthwise Tensile Strength

A separator sample (width=50 mm) cut from each of the separators prepared in Examples 1 to 7 and Comparative Examples 1 and 2 was set on a tensile tester (TENSILON UCT-500; ORIENTEC, Co.), and a lengthwise tensile strength (N/50 mm width) was measured at a chuck-to-chuck distance of 100 mm and a pulling rate of 300 mm/min. The results are shown in Table 1.

TABLE 1

|  | Crystallinity (%) | Sulfonation degree (×10$^{-3}$) | Capacity maintained (%) | Tensile strength (N/50 mm width) |
| --- | --- | --- | --- | --- |
| Example 1 | 28 | 4.2 | 44 | 147 |
| Example 2 | 28 | 11.0 | 52 | 98 |
| Example 3 | 28 | 2.8 | 43 | 157 |
| Example 4 | 28 | 2.1 | 30 | 157 |
| Example 5 | 28 | 4.4 | 51 | 176 |
| Example 6 | 28 | 1.1 | 31 | 167 |
| Example 7 | 28 | 8.1 | 51 | 108 |
| Comparative Example 1 | 24 | 5.1 | 2 | 127 |
| Comparative Example 2 | 28 | 4.0 | 5 | 147 |

As shown in Table 1, when the crystallinity is 25% or more, the ratio of the capacity maintained is excellent and is suitable for practical use, and when the sulfonation degree is $1.0 \times 10^{-3}$ to $10 \times 10^{-3}$, the ratio of the capacity maintained and the tensile strength are excellent, and are suitable for practical use.

Although the present invention has been described with reference to specific embodiments, various changes and modifications obvious to those skilled in the art are deemed to be within the spirit, scope, and concept of the invention.

What is claimed is:

1. An alkaline battery separator comprising a gas-permeable fiber sheet comprising hydrophilic fibers carrying a methacrylic/ethylene copolymer component having a crystallinity of 25% or more on at least a part of a surface of each of said hydrophilic fibers.

2. The alkaline battery separator according to claim 1, wherein a ratio of a total surface area of said methacrylic/ethylene copolymer components on said hydrophilic fibers in said fiber sheet to a total surface area of all constituent fibers contained in said fiber sheet is at least 10%.

3. The alkaline battery separator according to claim 1, wherein said fiber sheet is a member selected from the group consisting of a nonwoven fabric, a woven fabric, a knitted fabric, and a composite fabric thereof.

4. The alkaline battery separator according to claim 1, wherein said hydrophilic fiber is composed of only a methacrylic/ethylene copolymer having a crystallinity of at least 25%.

5. The alkaline battery separator according to claim 1, wherein said hydrophilic fiber is a composite fiber composed of the methacrylic/ethylene copolymer having a crystallinity of at least 25% and at least one other polymeric component.

6. The alkaline battery separator according to claim 5, wherein said composite fiber is covered with the methacrylic/ethylene copolymer having a crystallinity of at least 25% on a whole surface thereof.

7. The alkaline battery separator according to claim 6, wherein said composite fiber is a sheath-core and contains said methacrylic/ethylene copolymer component on a surface thereof.

8. The alkaline battery separator according to claim 1, wherein said fiber sheet consists essentially of said hydrophilic fibers.

9. The alkaline battery separator according to claim 1, wherein said fiber sheet contains, in addition to said hydrophilic fibers, at least one member selected from the group consisting of fine fibers having a fineness of less than 0.5 denier or less, high-strength fibers having a tensile strength of at least 5 g/denier and fusible fibers.

10. The alkaline battery separator according to claim 1, wherein said sheet is a fiber sheet containing hydrophilic resin powder materials adhered to surfaces of constituent fibers, said hydrophilic resin powder material carrying a methacrylic/ethylene copolymer component on at least a part of a surface of said powder material.

11. The alkaline battery separator according to claim 1, wherein said sheet is a microporous film containing hydrophilic portions carrrying said methacrylic/ethylene copolymer component on at least a part of a surface of said film.

12. The alkaline battery separator according to claim 1, wherein a hydrophilicity of said hydrophilic fibers is imparted or enhanced by sulfonation.

13. The alkaline battery separator according to claim 12, wherein said sheet has a sulfonation degree of $1 \times 10^{-3}$ to $10 \times 10^{-3}$.

14. An alkaline battery separator comprising a nonwoven fabric sheet of hydrophilic fibers carrying a methacrylic/ethylene copolymer component having a crystallinity of at least 25% on a whole surface of said hydrophilic fiber.

* * * * *